United States Patent [19]

Takakura et al.

[11] Patent Number: 5,706,213

[45] Date of Patent: Jan. 6, 1998

[54] APPARATUS FOR PROCESSING QUALITY CONTROL DATA

[75] Inventors: Keiji Takakura; Sigemitu Nakamura; Hiroshi Nagano; Ichirou Kouno; Yoshiharu Sakai, all of Sayama, Japan

[73] Assignee: Honda Giken Kogyo Kabushiki Kaisha, Tokyo, Japan

[21] Appl. No.: 610,288

[22] Filed: Mar. 4, 1996

[30] Foreign Application Priority Data

Mar. 9, 1995 [JP] Japan ................................. 7-049539

[51] Int. Cl.$^6$ ........................................ G06F 11/32
[52] U.S. Cl. ................ 364/552; 364/554; 364/478.1; 364/468.15; 364/550; 382/141
[58] Field of Search .................... 364/552, 554, 364/474.11, 474.16, 474.19, 550, 551.01, 474.24, 192, 479.14, 478.1, 475.09, 470.14, 468.24, 468.01, 468.02, 468.16, 468.15, 468.17, 191; 395/904, 912, 919, 923; 382/141-145

[56] References Cited

U.S. PATENT DOCUMENTS

| | | | |
|---|---|---|---|
| 4,709,337 | 11/1987 | Knapp et al. | 364/468.17 |
| 4,815,014 | 3/1989 | Lipner et al. | 364/550 |
| 5,208,870 | 5/1993 | Ennis | 382/143 |
| 5,339,257 | 8/1994 | Layden et al. | 364/552 |
| 5,461,570 | 10/1995 | Wang et al. | 364/468.17 |
| 5,477,446 | 12/1995 | Takakura et al. | 364/191 |

FOREIGN PATENT DOCUMENTS 0235958  9/1987  European Pat. Off. .

*Primary Examiner*—James P. Trammell
*Assistant Examiner*—Hal D. Wachsman

[57] ABSTRACT

When operating preference settings are selected on a setting image on a CRT through a touch panel, an operating preference setting unit controls the CRT to display a menu for establishing settings for connection of inspecting devices in respective processes of a production line and names with respect to data delivered from the inspecting devices, in coaction with the touch panel. After the settings have been made, the CRT displays an image based on which the generation of a server image is indicated. Under the control of a server image generating unit, it is determined whether items related by the operating preference setting unit are to be displayed or not, generating a displayed image. When a server operation is indicated on an image next displayed on the CRT, data delivered from the inspecting devices are processed according to conditions indicated by the operating preference setting unit and a server operating unit, and displayed on the CRT under the control of the server operating unit. In the production line for manufacturing parts and assemblies, the operator can establish and enter parameters relative to inspection processes through the touch panel on an interactive basis with the CRT, so that quality control data from the inspection processes can be processed and managed altogether without the need for the operator to be knowledgeable in programming.

7 Claims, 41 Drawing Sheets

FIG. 7

VARIOUS SETTINGS > DRIVE REGISTERING AND SETTING

| DISK | REGISTERED NAME |
|------|-----------------|
| J:   | ON-LINE DISK    |
| J:   | BACKUP MO       |
| B:   | FDD1            |
| A:   |                 |
|      |                 |
|      |                 |
|      |                 |
|      |                 |

SETTING END

SETTING CANCEL

FIG. 8

VARIOUS SETTINGS > DRIVE REGISTERING AND SETTING

| | DISK | | REGISTERED NAME |
|---|---|---|---|
| △ | : | SK | |
| △ | B: | | ON-LINE DISK |
| △ | : | | BACKUP MO |
| | : | | FDD1 |
| | | | |
| ▽ | | | |
| ▽ | | | |
| ▽ | | | |
| ▽ | | | |

| DETERMINE | | | CANCEL |

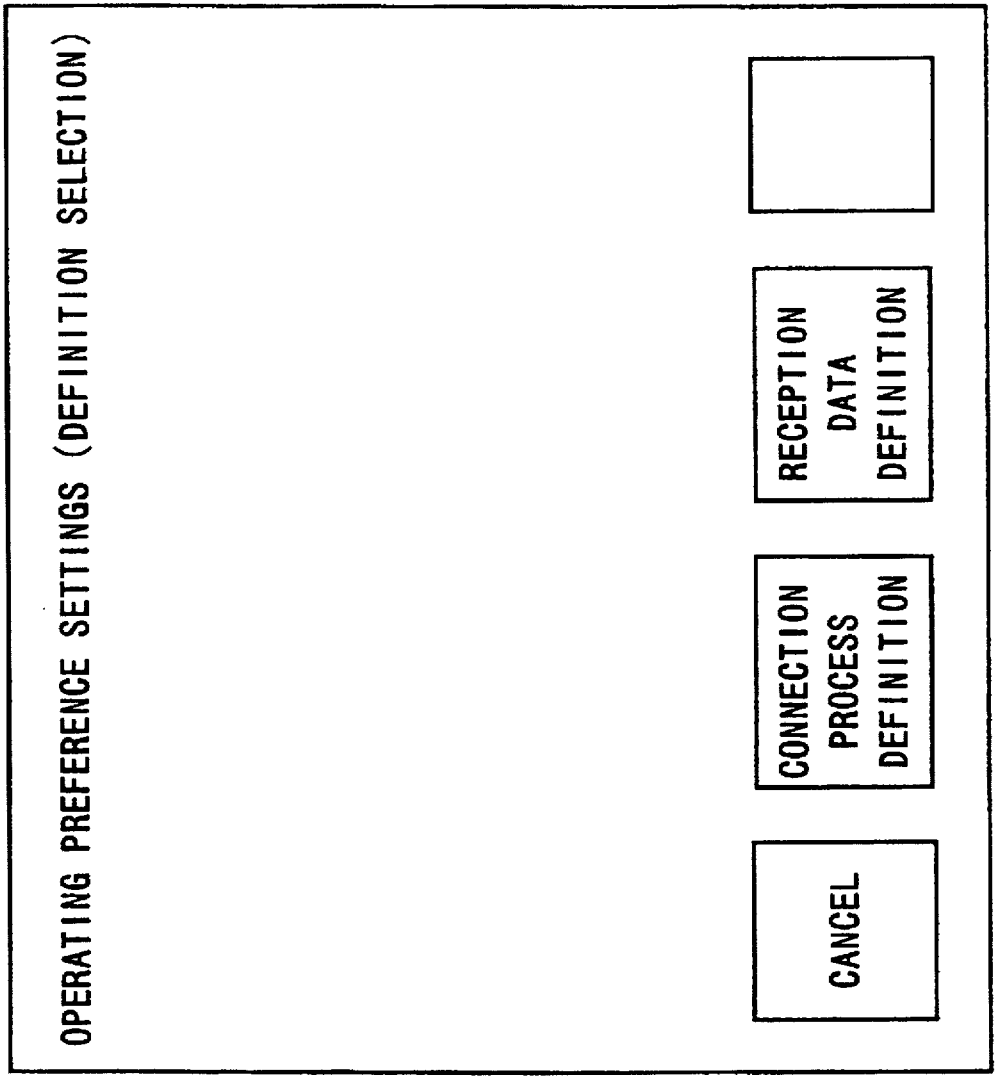

FIG. 11

OPERATING PREFERENCE SETTINGS - DATA DEFINITION

| △ | STATION NUMBER | CONNECTION DEFINITION | NAME |
|---|---|---|---|
| | 1 | GENERAL-PURPOSE QA | TORQUE QA MACHINE |
| | 2 | GENERAL-PURPOSE QA | CLEARANCE MEASURING MACHINE |
| | 3 | SEQUENCER | TIGHTENING CONFIRMATION MACHINE |
| ▽ | 4 | GENERAL-PURPOSE QA | GENERAL QA MACHINE |

IF STATION IS SEQUENCER, DEFINITION OF DATA IS REQUIRED. SELECT STATION NUMBER FOR WHICH DEFINITION IS TO BE MADE.

△ | CANCEL | | | SELECT | ▽

FIG. 12

| | DATA NUMBER | NAME | UNIT |
|---|---|---|---|
| △ | 1 | ROTATIONAL SPEED | rpm |
| | 2 | OUTPUT SHAFT TORQUE VALUE | Nm |
| | 3 | RIGHT FRONT WHEEL AVERAGE SPEED | Km/h |
| | 4 | FRICTION TORQUE UPPER LIMIT | Nm |
| ▽ | 5 | ***** | *** |

OPERATING PREFERENCE SETTINGS - DATA DEFINITION - STATION 4

△ | CANCEL | | DETERMINE | SELECT | ▽

FIG. 13

OPERATING PREFERENCE - DEVICE TYPE SELECTION

ESTABLISH TYPE NUMBER CORRESPONDING TO SERVER MONITOR IMAGE.
SELECT TYPE NUMBER FROM TABLE DISPLAYED BELOW.
UP TO 36 DEVICE TYPES CAN BE ESTABLISHED.

| △ | DEVICE TYPE NUMBER | DEVICE TYPE NAME | DEVICE TYPE NUMBER | DEVICE TYPE NAME |
|---|---|---|---|---|
| | 1 | **** | 6 | **** |
| | 2 | | 7 | |
| | 3 | | 8 | |
| | 4 | | 9 | |
| ▽ | 5 | | 10 | |

| CANCEL | SELECT | | END |

FIG. 14

OPERATING PREFERENCE SETTING - CONNECTING PROCESS DEFINITION

| STATION NUMBER | CONNECTION DEFINITION | NAME |
|---|---|---|
| 1 | GENERAL-PURPOSE QA | TORQUE QA MACHINE |
| 2 | GENERAL-PURPOSE QA | CLEARANCE MEASURING MACHINE |
| 3 | SEQUENCER | TIGHTENING CONFIRMING MACHINE |
| 4 | GENERAL-PURPOSE QA | GENERAL QA MACHINE |
| 5 | | |
| 6 | | |
| 7 | | |
| 8 | | |
| 9 | | |

AFTER STATION NUMBER IS SELECTED, SELECT CORRESPONDING CONNECTION DEFINITION FROM BUTTONS BELOW. AFTER STATION NUMBER TO BE ESTABLISHED IS SELECTED, ENTER NAME THROUGH KEYBOARD.

SELECT DISCHARGE STATION FROM ABOVE TABLE.

| STATION NUMBER 4 | 4AT GENERAL QA MACHINE |

| CANCEL | GENERAL-PURPOSE QA | SEQUENCER | DETERMINE |

FIG. 16

IMAGE GENERATION - DEVICE TYPE SELECTION

SELECT DEVICE TYPE NUMBER CORRESPONDING TO SERVER MONITOR IMAGE. SELECT DEVICE TYPE NUMBER FROM TABLE DISPLAYED BELOW. UP TO 32 DEVICE TYPES CAN BE ESTABLISHED.

| △ | DEVICE TYPE NUMBER | DEVICE TYPE NAME | DEVICE TYPE NUMBER | DEVICE TYPE NAME |
|---|---|---|---|---|
| | 1 | ***** | 6 | ***** |
| | 2 | | 7 | |
| | 3 | | 8 | |
| | 4 | | 9 | |
| ▽ | 5 | | 10 | |

| CANCEL | SELECT | DELETE | SAVE |

FIG. 17

IMAGE GENERATION - LIST IMAGE GENERATION - STATION SELECTION

SELECT STATION NUMBER FOR WHICH LIST IMAGE IS TO BE GENERATED.

| STATION NUMBER | CONNECTION DEFINITION | NAME |
|---|---|---|
| 1 | GENERAL-PURPOSE QA | TORQUE QA MACHINE |
| 2 | GENERAL-PURPOSE QA | CLEARANCE MEASURING MACHINE |
| 3 | SEQUENCER | TIGHTENING CONFIRMING MACHINE |
| 4 | GENERAL-PURPOSE QA | GENERAL QA MACHINE |
| 5 | | |
| 6 | | |
| 7 | | |
| 8 | | |
| 9 | | |

| CANCEL | LIST IMAGE GENERATION | | SELECTION |

FIG. 18

```
IMAGE GENERATION - LIST IMAGE GENERATION - SELECTION
OF ITEMS TO BE DISPLAYED AND DETERMINED - ST1: TORQUE QA
MACHINE
```

| △ | NAME OF ITEM TO BE DETERMINED | | | |
|---|---|---|---|---|
| | INSERTION LOAD | BACKLASH | | |
| | | | | |
| | | | | |
| | | | | |
| | | | | |
| ▽ | | | | |

SELECT ITEM TO BE DISPLAYED.

△ | CANCEL | | | DETERMINE | ▽

FIG. 19

IMAGE GENERATION - LIST IMAGE GENERATION

DEVICE TYPE: 4AT  PRODUCTION DATE: 1994-10-17(MON)  ST1: TORQUE QA MACHINE

| PRODUCT NUMBER | DECISION | INSERTION LOAD | BACKLASH | *** |
|---|---|---|---|---|
| ****** | OK | *** | | |
| ****** | OK | 390.25 | | |
| ****** | NG | 390.25 | | |
| ****** | | 390.25 | | |
| ****** | | 390.25 | | |
| ******* | | 390.25 | | |
| ****** | | 390.25 | | |
| ****** | | 390.25 | | |
| ****** | | 390.25 | | |
| ******* | | 390.25 | | |
| ****** | | 390.25 | | |
| ****** | | 390.25 | | |
| ****** | | 390.25 | | |
| ****** | | 390.25 | | |
| ****** | | 500.25 | | |

[CANCEL] [DEVICE TYPE DISPLAY] [DATE DISPLAY] [PRODUCT NUMBER DISPLAY]

FIG. 21

| | DEVICE TYPE NUMBER | DEVICE TYPE NAME | DEVICE TYPE NUMBER | DEVICE TYPE NAME |
|---|---|---|---|---|
| △ | 1 | TRANSMISSION FOR DEVICE TYPE A | 6 | ***** |
| | 2 | | 7 | |
| | 3 | | 8 | |
| | 4 | | 9 | |
| ▽ | 5 | | 10 | |

SERVER OPERATION - DEVICE TYPE SELECTION

SELECT DEVICE TYPE NUMBER FOR SERVER OPERATION.

CANCEL   DETERMINE

FIG. 22

DEVICE TYPE: 4AT   PRODUCTION DATE: 1994-10-17(MON)

ST1: TORQUE QA MACHINE

| PRODUCT NUMBER | DECISION | INSERTION LOAD | *** | BACKLASH | *** | *** | *** |
|---|---|---|---|---|---|---|---|
| ****** | OK | *** | | | | | |
| ****** | OK | 390.25 | | | | | |
| ****** | NG | 390.25 | | | | | |
| ****** | | 390.25 | | | | | |
| ****** | | 390.25 | | | | | |
| ****** | | 390.25 | | | | | |
| ****** | | 390.25 | | | | | |
| ****** | | 390.25 | | | | | |
| ****** | | 390.25 | | | | | |
| ****** | | 390.25 | | | | | |
| ****** | | 390.25 | | | | | |
| ****** | | 390.25 | | | | | |
| ****** | | 390.25 | | | | | |
| ****** | | 390.25 | | | | | |
| ****** | | 390.25 | | | | | |
| ****** | | 500.25 | | | | | |

| EDIT | TOTAL DISCHARGE NUMBER DISPLAY | STATISTICAL IMAGE DISPLAY | DISCHARGE TIME DISPLAY |

FIG. 23

```
TOTAL DISCHARGE NUMBER IMAGE

DEVICE TYPE: *****
```

| ITEM | BALL INSERTING MACHINE | ALIGNMENT MEASURING MACHINE | | |
|---|---|---|---|---|
| | ← PRODUCTION DATE: 1994-10-17(MON) → | | | |
| TOTAL NUMBER OF PRODUCTS | ***** | | | |
| NUMBER OF GOOD PRODUCTS | | | | |
| NUMBER OF POOR PRODUCTS | | | | |
| SINGLE-TEST ACCEPTANCE RATIO | | | | |

△  RETURN TO LIST IMAGE  ▽

FIG. 24

| STATISTICAL DATA IMAGE | | | | PRODUCTION DATE: 1994-10-17(MON) | | | | | |
|---|---|---|---|---|---|---|---|---|---|

DEVICE TYPE : ******

| ITEM | ← ST1: TORQUE QA MACHINE → | | | | | | | | |
|---|---|---|---|---|---|---|---|---|---|
| | INSERTION LOAD | *** | BACHLASH | *** | *** | *** | *** | *** | |
| AVERAGE | | | | | | | | | |
| MAXIMUM | | | | | | | | | |
| MINIMUM | | | | | | | | | |
| 3σ | | | | | | | | | |

△ | RETURN TO LIST IMAGE | | | | ▽

FIG. 25

| DEVICE TYPE: 4AT | | | ST4: GENERAL QA DEVICE 1994-10-17(MON) | | |
|---|---|---|---|---|---|
| PRODUCT NUMBER | DECISION | DISCHARGE TIME | PRODUCT NUMBER | DECISION | DISCHARGE TIME |
| SA0-00000001 | OK | 07:15:45 | SA0-00000001 | OK | 07:15:45 |
| SA0-00000002 | OK | 07:17:45 | SA0-00000002 | OK | 07:17:45 |
| SA0-00000003 | OK | 07:19:45 | SA0-00000002 | OK | 07:17:45 |
| SA0-00000004 | OK | 07:27:45 | SA0-00000002 | OK | 07:17:45 |
| SA0-00000005 | OK | 07:37:45 | SA0-00000002 | OK | 07:17:45 |
| SA0-00000006 | OK | 07:47:45 | SA0-00000002 | OK | 07:17:45 |
| SA0-00000007 | OK | 07:57:45 | SA0-00000002 | OK | 07:17:45 |
| SA0-00000008 | OK | 07:67:45 | SA0-00000002 | OK | 07:17:45 |
| SA0-00000009 | OK | 08:17:45 | SA0-00000002 | OK | 07:17:45 |
| SA0-00000010 | OK | 07:17:45 | SA0-00000002 | OK | 07:17:45 |
| SA0-00000011 | OK | 07:17:45 | SA0-00000002 | OK | 07:17:45 |
| SA0-00000012 | OK | 07:17:45 | SA0-00000002 | OK | 07:17:45 |
| SA0-00000013 | OK | 07:17:45 | SA0-00000002 | OK | 07:17:45 |
| SA0-00000014 | OK | 07:17:45 | SA0-00000002 | OK | 07:17:45 |
| SA0-00000015 | OK | 07:17:45 | SA0-00000002 | OK | 07:17:45 |
| SA0-00000016 | OK | 07:17:45 | SA0-00000002 | OK | 07:17:45 |
| SA0-00000017 | OK | 07:17:45 | SA0-00000002 | OK | 07:17:45 |
| SA0-00000018 | OK | 07:17:45 | SA0-00000002 | OK | 07:17:45 |
| SA0-00000019 | OK | 07:17:45 | SA0-00000002 | OK | 07:17:45 |

RETURN TO LIST IMAGE

FIG. 27

DATA PROCESSING - MO DRIVE

| | NUMBER | DEVICE TYPE NAME |
|---|---|---|
| △ | 1 | BS-4WD |
| | 2 | SH-4WD |
| | 3 | BS OIL PRESSURE TEST |
| | 4 | BS OIL TEMPERATURE TEST |
| | 5 | BS JUDDER TEST |
| | 6 | |
| | 7 | |
| ▽ | 8 | |

SELECT DEVICE TYPE TO BE HANDLED AND DATA DISPLAY METHOD.

| CANCEL | DATE INDICATION | NUMBER INDICATION | |

FIG. 28

DATA PROCESSING - DEVICE TYPE I: 4AT - MO DRIVE - NUMBER INDICATION

| | TIME | NUMBER | DETERMINED RESULT | TIME | NUMBER | DETERMINED RESULT |
|---|---|---|---|---|---|---|
| △ | | | | | | |
| | | | | | | |
| | | | | | | |
| | | | | | | |
| ▽ | | | | | | |

NUMBER: |(1)|
DETERMINED RESULT: |(2)|
SELECT NUMBER OF DATA TO BE HANDLED AND PROCESSING CONTENTS.

| △ | CANCEL | LIST IMAGE DISPLAY | INDIVIDUAL STATION DISPLAY | DATA DELETION | ▽ |

FIG. 30

DATA PROCESSING - DEVICE TYPE 1: 4AT - MO DRIVE-
NUMBER INDICATION - INDIVIDUAL STATION DISPLAY

SELECT STATION NUMBER TO BE DISPLAYED.

| STATION NUMBER | CONNECTION DEFINITION | NAME |
|---|---|---|
| 1 | GENERAL-PURPOSE QA | TORQUE QA MACHINE |
| 2 | GENERAL-PURPOSE QA | CLEARANCE MEASURING MACHINE |
| 3 | SEQUENCER | TIGHTENING CONFIRMING MACHINE |
| 4 | GENERAL-PURPOSE QA | GENERAL QA MACHINE |
| 5 | | |
| 6 | | |
| 7 | | |
| 8 | | |
| 9 | | |

CANCEL │ │ │ SELECTION

FIG. 31

| CLEARANCE MEASURING MACHINE | OPERATOR: TARO HONDA | 94-12-09 (FRI) 08:55:44 |
|---|---|---|
| DEVICE TYPE 1: BS-4WD | No:SL5-1234567836547 | OK |
| AUTOMATIC MODE | PROCEDURE NUMBER 15: CLEARANCE MEASURING PROCESS | |
| | MEASURED CLEARANCE | 12.356 |

IN NORMAL OPERATION

FIG. 32

DATA PROCESSING - DEVICE TYPE 1: 4AT - MO DRIVE - DATE INDICATION

| MEASURED DATE | MEASURED DATE | MEASURED DATE | MEASURED DATE | MEASURED DATE | MEASURED DATE |
|---|---|---|---|---|---|
| 94-10-17 | 94-10-27 | 94-11-08 | 94-11-18 | 94-11-30 | 94-12-12 | 94-12-22 |
| 94-10-18 | 94-10-28 | 94-11-09 | 94-11-21 | 94-12-01 | 94-12-13 | 94-12-23 |
| 94-10-19 | 94-10-31 | 94-11-10 | 94-11-22 | 94-12-01 | 94-12-14 | 94-12-26 |
| 94-10-20 | 94-11-01 | 94-11-11 | 94-11-23 | 94-12-05 | 94-12-15 | 94-12-27 |
| 94-10-21 | 94-11-02 | 94-11-14 | 94-11-24 | 94-12-06 | 94-12-16 | 94-12-28 |
| 94-10-24 | 94-11-03 | 94-11-15 | 94-11-25 | 94-12-07 | 94-12-19 | |
| 94-10-25 | 94-11-04 | 94-11-16 | 94-11-28 | 94-12-08 | 94-12-20 | |
| 94-10-26 | 94-11-07 | 94-11-17 | 94-11-29 | 94-12-09 | 94-12-21 | |

SELECT DATE OF DATA TO BE HANDLED AND PROCESSING CONTENTS.

CANCEL | LIST IMAGE DISPLAY | TOTAL DISCHARGE NUMBER DISPLAY | STATISTICAL IMAGE DISPLAY

FIG. 33

TOTAL DISCHARGE NUMBER IMAGE

DEVICE TYPE : *****

| ← | PRODUCTION DATE: 1994-10-17(MON) 1/4 | | → | | |
|---|---|---|---|---|---|
| ITEM | BALL INSERTING MACHINE | ALIGNMENT MEASURING MACHINE | | | |
| TOTAL NUMBER OF PRODUCTS | ***** | | | | |
| NUMBER OF GOOD PRODUCTS | | | | | |
| NUMBER OF POOR PRODUCTS | | | | | |
| SINGLE-TEST ACCEPTANCE RATIO | | | | | |

FIG. 34

STATISTICAL DATA IMAGE    PRODUCTION DATE: 1994-10-17(MON)

DEVICE TYPE: ******

| | INSERTION LOAD | BACKLASH | | | | | ↑ |
|---|---|---|---|---|---|---|---|
| ← | *** | *** | *** | *** | *** | *** | |
| ITEM | | | ST4: BALL INSERTING MACHINE | | | | |
| AVERAGE | | | | | | | |
| MAXIMUM | | | | | | | |
| MINIMUM | | | | | | | |
| 3σ | | | | | | | |

FIG. 36

DATA CONVERSION - DEVICE TYPE SELECTION

SELECT DEVICE TYPE NUMBER FOR WHICH DATA ARE TO BE CONVERTED.

| △ | DEVICE TYPE NUMBER | DEVICE TYPE NAME | DEVICE TYPE NUMBER | DEVICE TYPE NAME |
|---|---|---|---|---|
| | 1 | TRANSMISSION FOR DEVICE TYPE A | 6 | **** |
| | 2 | | 7 | |
| | 3 | | 8 | |
| | 4 | | 9 | |
| ▽ | 5 | | 10 | |

| CANCEL | | | DETERMINE |

FIG. 37

| | STATION NUMBER | CONNECTION DEFINITION | NAME |
|---|---|---|---|
| DATA CONVERSION - STATION SELECTION | | | |
| | 1 | GENERAL-PURPOSE QA | CLEARANCE MEASURING MACHINE |
| | 2 | GENERAL-PURPOSE QA | TORQUE QA MACHINE |
| | 3 | SEQUENCER | ROTATION CONFIRMING MACHINE |
| | 4 | SEQUENCER | TIGHTENING CONFIRMING MACHINE |
| | 5 | GENERAL-PURPOSE QA | GENERAL QA MACHINE |

CANCEL    SELECTION

FIG. 38

STATISTICAL DATA CONVERSION - DEVICE TYPE I: 4AT - CLEARANCE ADJUSTING MACHINE - MO DRIVE - DATE INDICATION

| MEASURED DATE | MEASURED DATE | MEASURED DATE | MEASURED DATE | MEASURED DATE | MEASURED DATE |
|---|---|---|---|---|---|
| 94-10-17 | 94-10-27 | 94-11-08 | 94-11-18 | 94-11-30 | 94-12-12 | 94-12-22 |
| 94-10-18 | 94-10-28 | 94-11-09 | 94-11-21 | 94-12-01 | 94-12-13 | 94-12-23 |
| 94-10-19 | 94-10-31 | 94-11-10 | 94-11-22 | 94-12-01 | 94-12-14 | 94-12-26 |
| 94-10-20 | 94-11-01 | 94-11-11 | 94-11-23 | 94-12-05 | 94-12-15 | 94-12-27 |
| 94-10-21 | 94-11-02 | 94-11-14 | 94-11-24 | 94-12-06 | 94-12-16 | 94-12-28 |
| 94-10-24 | 94-11-03 | 94-11-15 | 94-11-25 | 94-12-07 | 94-12-19 | |
| 94-10-25 | 94-11-04 | 94-11-16 | 94-11-28 | 94-12-08 | 94-12-20 | |
| 94-10-26 | 94-11-07 | 94-11-17 | 94-11-29 | 94-12-09 | 94-12-21 | |

SELECT DATE OF DATA TO BE HANDLED AND PROCESSING CONTENTS.

CANCEL    DETERMINE

FIG. 39

STATISTICAL DATA CONVERSION - MO DRIVE - DEVICE TYPE NUMBER
1 BS-4WD (94-12-01) LOTUS CONVERSION

| TIME | NUMBER | DETERMINED RESULT | TIME | NUMBER | DETERMINED RESULT |
|---|---|---|---|---|---|
| 08-30-12 | A0000095 | OK | 13-32-11 | A0000101 | OK |
| 08-59-23 | A0000092 | NG | 13-32-22 | A0000103 | OK |
| 09-28-34 | A0000096 | NG | 13-32-33 | A0000104 | OK |
| 09-57-45 | A0000097 | OK | 13-32-44 | A0000102 | OK |
| 10-26-56 | A0000090 | NG | 15-32-33 | A0000105 | OK |
| 10-55-07 | A0000099 | OK | 15-32-44 | A0000110 | OK |
| 11-24-18 | A0000098 | OK | 15-32-55 | A0000109 | OK |
| 13-32-00 | A0000100 | OK | 16-00-55 | A0000111 | OK |

SELECT DATA CONTAINING DETERMINED VALUE TO BE CONVERTED.

| CANCEL | RANGE INDICATION AND SELECTION | RANGE INDICATION CANCEL | SELECTION OF ALL | ALL SELECTION CANCEL | DETERMINE |

PRIORITY NUMBER DISPLAY

FIG. 40

STATISTICAL DATA CONVERSION - MO DRIVE - DEVICE TYPE NUMBER
1 BS-4WD (94-12-01) LOTUS CONVERSION

| TIME | NUMBER | DETERMINED RESULT | | TIME | NUMBER | DETERMINED RESULT |
|---|---|---|---|---|---|---|
| 13-32-00 | A0000100 | OK | | | | |
| 13-32-11 | A0000101 | OK | | | | |
| 13-32-22 | A0000103 | OK | | | | |
| 13-32-33 | A0000104 | OK | | | | |
| 13-32-44 | A0000102 | OK | | | | |
| 15-32-33 | A0000105 | OK | | | | |
| 15-32-44 | A0000110 | OK | | | | |
| 15-32-55 | A0000109 | OK | | | | |
| 16-00-55 | A0000111 | OK | | | | |

◁ ▷

SAVING LOCATION FOR CONVERTED DATA: |(1)|
SAVING FILE NAME: |(2)| (IN 4 KANA, KANJI LETTERS, OR 8
ALPHANUMERIC, KANA LETTERS)

[CANCEL]  [DETERMINE]

FIG. 41

STATISTICAL DATA CONVERSION - MO DRIVE - DEVICE TYPE NUMBER
1 BS-4WD (94-12-01) LOTUS CONVERSION

| TIME | NUMBER | DETERMINED RESULT | TIME | NUMBER | DETERMINED RESULT |
|---|---|---|---|---|---|
| 13-32-00 | A0000100 | OK | | | |
| 13-32-11 | A0000101 | OK | | | |
| 13-32-22 | A0000103 | OK | | | |
| 13-32-33 | A0000104 | OK | | | |
| 13-32-44 | A0000102 | OK | | | |
| 15-32-33 | A0000105 | OK | | | |
| 15-32-44 | A0000110 | OK | | | |
| 15-32-55 | A0000109 | OK | | | |
| 16-00-55 | A0000111 | OK | | | |

IS IT OK TO CONVERT ABOVE DETERMINED RESULT OF DATA INTO LOTUS FORMAT AND SAVE IT IN FLOPPY DISK UNDER THE FILE NAME OF BS-4WD-1 ?

CANCEL          DETERMINE

APPARATUS FOR PROCESSING QUALITY CONTROL DATA

BACKGROUND OF THE INVENTION

1. Field of the Invention

The present invention relates to an apparatus for processing altogether quality control data which include measurement data, determined-quality data, etc. that are produced in an inspection process carried out for quality control in each of a plurality of production processes of a production line for manufacturing parts, assemblies, etc.

2. Description of the Related Art

For the production of automobiles or the like, it is customary to manufacture many parts and assemblies in production lines and processes, and assemble the parts and assemblies into completed automobiles in a final assembling process. The production processes for manufacturing such parts and assemblies and also the final assembling process for producing final products or automobiles contain inspection processes for controlling and maintaining the desired quality of final products. In those inspection processes, the parts, assemblies, and final products are measured and examined for their structures and functions, and determined for their quality.

Heretofore, inspection devices for measuring parts, assemblies, and final products and determining their quality have been designed independently and exclusively for use in the respective inspection processes by designers or dedicated programmers. The designers or dedicated programmers of those inspection devices have also developed and designed various procedures and data formats for use with the inspection devices. Those various procedures and data formats include, for example, procedures for identifying parts and assemblies to be inspected, formats of identification data of parts and assemblies to be inspected, procedures for measuring parts and assemblies to be inspected, formats of measurement data of parts and assemblies to be inspected, procedures for determining the quality of parts and assemblies, and formats of data of quality determination standards and determined quality.

The above conventional practice for the quality control of automobiles or the like has resulted in long periods of time required for research and development of new automobiles because inspection devices are developed and designed exclusively for use in respective inspection processes for quality control. If those periods of time required for research and development of new automobiles are to be shortened, then an increased number of dedicated programmers will be needed, and hence the cost of research and development will be increased. Another problem is that since it is difficult for workers at production sites to make quick and smooth alterations of specifications of inspection devices as required by addition of new product types and improvement of products, a plurality of dedicated programmers are assigned to each inspection processes for handling any alterations of specifications of inspection devices, and such alterations of specifications are time-consuming.

It has been desired to centrally be able to process for subsequent statistical and analytic data processing, the quality control data, which include the identification data, measurement data, and determined-quality data of parts and assemblies to be inspected in the inspection processes. For such data processing, it is necessary to develop and design an apparatus for processing quality control data. However, if an apparatus for processing quality control data is developed and designed, then it is necessary to develop and design inspection devices according to the basic design specifications of the apparatus. Developing and designing such inspection devices requires a large number of processing steps, a long period of time, and a large expenditure of expenses.

SUMMARY OF THE INVENTION

It is therefore an object of the present invention to provide an apparatus for processing quality control data, which allows the operator to establish and enter parameters relative to inspection processes through an input means on an interactive basis from menus and dialog boxes displayed on a display monitor, so that quality control data from the inspection processes can be centrally processed and managed easily without the need for the operator to be knowledgeable in programming, and the apparatus can be used with production lines for producing various different types of products.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a view illustrative of a displayed image of a disk setting dialog box in the process of establishing system settings of the apparatus for processing quality control data shown in FIG. 1;

FIG. 8 is a view illustrative of a displayed image of a drive registering and setting dialog box in the process of establishing system settings of the apparatus for processing quality control data shown in FIG. 1;

FIG. 10 is a view illustrative of a displayed image of a definition selecting menu in the process of establishing operating preference settings of the apparatus for processing quality control data shown in FIG. 1;

FIG. 11 is a view illustrative of a displayed image of a data defining dialog box in the process establishing operating preference settings of the apparatus for processing quality control data shown in FIG. 1;

FIG. 12 is a view illustrative of a displayed image of a data defining (for a station 4, for example) dialog box in the process establishing operating preference settings of the apparatus for processing quality control data shown in FIG. 1;

FIG. 13 is a view illustrative of a displayed image of a type selecting dialog box in the process of establishing operating preference settings of the apparatus for processing quality control data shown in FIG. 1;

FIG. 14 is a view illustrative of a displayed image of a connection process defining dialog box in the process of establishing operating preference settings of the apparatus for processing quality control data shown in FIG. 1;

FIG. 16 is a view illustrative of a displayed image of a type selecting dialog box in the process of generating a displayed server image in the apparatus for processing quality control data shown in FIG. 1;

FIG. 17 is a view illustrative of a displayed image of a station selecting dialog box in the process of generating a displayed server image in the apparatus for processing quality control data shown in FIG. 1;

FIG. 18 is a view illustrative of a displayed image of a displayed and determined item selecting dialog box in the process of generating a displayed server image in the apparatus for processing quality control data shown in FIG. 1;

FIG. 19 is a view illustrative of a displayed image of a list image generating dialog box in the process of generating a displayed server image in the apparatus for processing quality control data shown in FIG. 1;

FIG. 21 is a view illustrative of a displayed image of a type selecting dialog box in the process of operating a server in the apparatus for processing quality control data shown in FIG. 1;

FIG. 22 is a view illustrative of a displayed image of a list in the process of operating a server in the apparatus for processing quality control data shown in FIG.

FIG. 23 is a view illustrative of a displayed image of a total discharged number in the process of operating a server in the apparatus for processing quality control data shown in FIG. 1;

FIG. 24 is a view illustrative of a displayed image of statistical data in the process of operating a server in the apparatus for processing quality control data shown in FIG. 1;

FIG. 25 is a view illustrative of a displayed image of discharged times in the process of operating a server in the apparatus for processing quality control data shown in FIG. 1;

FIG. 27 is a view illustrative of a displayed image of a type selecting dialog box in the process of processing data in the apparatus for processing quality control data shown in FIG. 1;

FIG. 28 is a view illustrative of a displayed image of a type/number selecting dialog box in the process of processing data in the apparatus for processing quality control data shown in FIG. 1;

FIG. 30 is a view illustrative of a displayed image of an individual station display dialog box in the process of processing data in the apparatus for processing quality control data shown in FIG. 1;

FIG. 31 is a view illustrative of a displayed image of an individual station in the process of processing data in the apparatus for processing quality control data shown in FIG. 1;

FIG. 32 is a view illustrative of a displayed image of a date indicating dialog box in the process of processing data in the apparatus for processing quality control data shown in FIG. 1;

FIG. 33 is a view illustrative of a displayed image of a total discharged number in the process of processing data in the apparatus for processing quality control data shown in FIG. 1;

FIG. 34 is a view illustrative of a displayed image of statistical data in the process of processing data in the apparatus for processing quality control data shown in FIG. 1;

FIG. 36 is a view illustrative of a displayed image of a type selecting dialog box in the process of converting data in the apparatus for processing quality control data shown in FIG. 1;

FIG. 37 is a view illustrative of a displayed image of a station selecting dialog box in the process of converting data in the apparatus for processing quality control data shown in FIG. 1;

FIG. 38 is a view illustrative of a displayed image of a date indicating dialog box in the process of converting data in the apparatus for processing quality control data shown in FIG. 1;

FIG. 39 is a view illustrative of a displayed image of a range indicating and selecting dialog box in the process of converting data in the apparatus for processing quality control data shown in FIG. 1;

FIG. 40 is a view illustrative of a displayed image of a saving location selecting dialog box in the process of converting data in the apparatus for processing quality control data shown in FIG. 1; and FIG. 41 is a view illustrative of a displayed image of a data conversion dialog box in the process of converting data in the apparatus for processing quality control data shown in FIG. 1.

DETAILED DESCRIPTION OF THE PREFERRED EMBODIMENT

Figure 1:
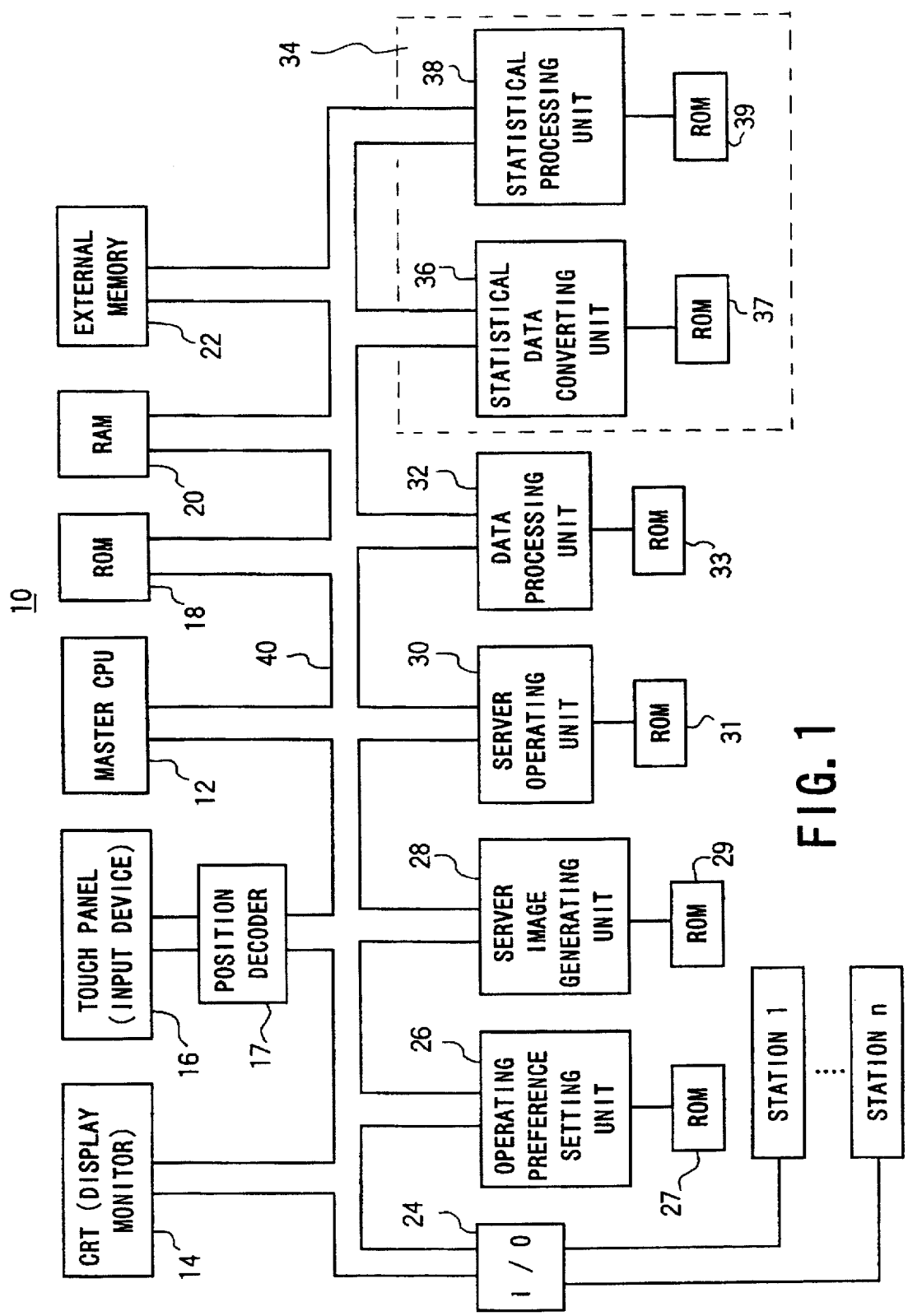
FIG. 1 is a block diagram of an apparatus for processing quality control data according to the present invention.

As shown in FIG. 1, an apparatus 10 for processing quality control data (hereinafter also referred to as a "quality control data processing apparatus") includes a master central processing unit (CPU) 12 for controlling the quality control data processing apparatus 10 as a whole, a cathode-ray tube (CRT) 14 as a display monitor, a touch panel 16 combined as an input device with the CRT 14, a position decoder 17 for detecting a position at which the operator of the quality control data processing apparatus 10 contacts the touch panel 16 with a finger, a read-only memory (ROM) 18 which stores a program for controlling the quality control data processing apparatus 10, a random-access memory (RAM) 20 for temporarily storing data processed by the master CPU 12, external memories 22 such as magnetic disk devices, etc. for storing quality control data, and a bus line 40 connected to the master CPU 12, CRT 14, the touch panel 16, the position decoder 17, the ROM 18, the RAM 20, and the external memories 22.

The quality control data processing apparatus 10 also includes an input/output interface (I/O) 24 connected to a plurality of stations 1~n, for introducing quality control data from the stations 1~n. The stations 1~n serve as inspection devices for measuring and inspecting parts and assemblies in respective inspection processes on a production line for manufacturing automobiles, for example, processing and managing quality control data. The quality control data processing apparatus 10 further includes an operating preference setting unit 26 for indicating the stations 1~n, establishing connection destinations and names, procedures for processing quality control data transmitted from the stations 1~n, and indicating stations for finally discharging managed products.

The quality control data processing apparatus 10 also has a server image generating unit 28 for indicating a server image to display, on a server operating image, items established and related by the operating preference setting control data transmitted from the stations 1~n under conditions specified by the operating preference setting unit 26 and the server image generating unit 28, and displaying the processed quality control data, a data processing unit 32 for searching for quality control data including numerical data related to products manufactured by the production line and determined-quality data, based on production dates, product numbers (product identification numbers or the like), etc., displaying and printing the quality control data, a data converter 34 for searching for quality control data including numerical data related to products manufactured by the production line and determined-quality data, based on production dates, product numbers, and converting the quality control data into data that can be processed for statistical applications. The I/O 24, the operating preference setting unit 26, the server image generating unit 28, the server operating unit 30, the data processing unit 32, and the data converter 34 are connected to the bus line 40.

The data converter 34 comprises a statistical data converting unit 36 for converting quality control data including numerical data related to products manufactured by the production line and determined-quality data into data that can be statistically processed, and a statistical processing unit 38 for searching for the quality control data as converted into the data that can be statistically processed by the statistical data converting unit 36, and statistically processing the data into a statistical data output.

The operating preference setting unit 26, the server image generating unit 28, the server operating unit 30, the data processing unit 32, the statistical data converting unit 36, and the statistical processing unit 38 are associated with respective ROMs 27, 29, 31, 33, 37, 39 which store programs for performing their respective functions.

The quality control data processing apparatus 10 basically operates as follows: When the operator of the quality control data processing apparatus 10 touches the touch panel 16 with the finger, it enters positional data through the position decoder 17, causing the operating preference setting unit 26, the server image generating unit 28, the server operating unit 30, the data processing unit 32, and the data converter 34 (the statistical data converting unit 36 and the statistical processing unit 38) to perform functions of their functional units. The functional units display predetermined images on the CRT 14 for interactive communications with the operator, and the operator selects items displayed on the CRT 14 to establish operating and displaying conditions, etc. Image data to be displayed for interactive communications with the operator may be stored in the ROMs 27, 29, 31, 33, 37, 39 in the functional units or the external memories 22.

The quality control data processing apparatus 10 reads quality control data from the stations 1~n connected thereto which measure and inspect parts and assemblies in respective inspection processes on a production line for manufacturing automobiles, for example, and processes and manages altogether the quality control data thus read.

Figure 2:
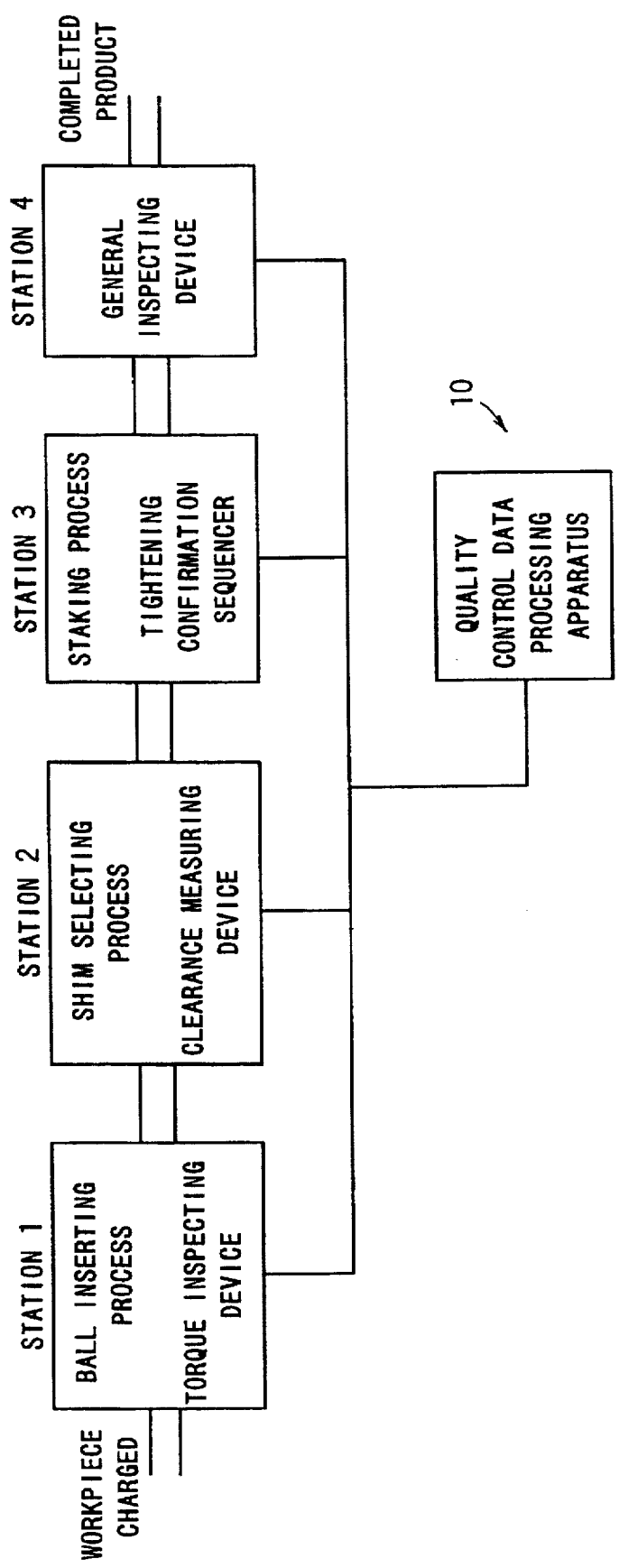
FIG. 2 is a block diagram of an automobile transmission production line which incorporates the apparatus for processing quality control data shown in FIG. 1.

FIG. 2 shows in block form an automobile transmission production line which incorporates the quality control data processing apparatus 10.

As shown in FIG. 2, a workpiece loaded into the automobile transmission production line is supplied to a ball inserting process in a station 1 in which balls for a transmission shaft are inserted into a transmission input shaft under a given load. In the ball insertion process in the station 1, the workpiece is inspected by a torque inspection device which measures the load under which the balls are inserted and a gap or clearance between the shaft and a bearing after the balls are inserted. Then, the workpiece is fed to a shim selecting process in a station 2 in which a transmission output shaft is adjusted in height so that it has a preset height. In the station 2, the height of the transmission output shaft is measured by a clearance measuring device and a spacer is placed in a predetermined location so that the measured height is equal to the preset height. Thereafter, the workpiece is fed to a staking process in a station 3 in which a protective cover for protecting the transmission mechanism is attached by staking or the like. In the staking process in the station 3, the attachment of the protective cover is confirmed, and then the protective cover is attached by a staking device or the like. Thereafter, the workpiece is fed to a general inspecting process in a station 4 in which the transmission input shaft is rotated at several speeds, and changes in the rotational speed of the transmission output shaft are measured at the several speeds by a inspecting device to determine whether predetermined transmission characteristics are obtained or not. If the inspected workpiece is satisfactory, then the workpiece is discharged as a completed product to a next production line.

The inspecting devices, measuring devices, etc. in the stations 1~4 are connected to the quality control data processing apparatus 10, which reads quality control data including measured data, determined-quality data, etc. from the stations 1~4 and processes the read quality control data.

A process of processing and managing altogether the quality control data in the inspecting processes with the quality control data processing apparatus 10 will be described below with reference to FIGS. 1 through 41.

Selections and settings are made by the operator of the quality control data processing apparatus 10 when the operator touches the touch panel 16 with the finger. The position decoder 17 detects a position at which the operator contacts the touch panel 16, and the master CPU 12 transfers control to various components of the quality control data processing apparatus 10 depending on the position detected by the position decoder 17.

Figure 3:
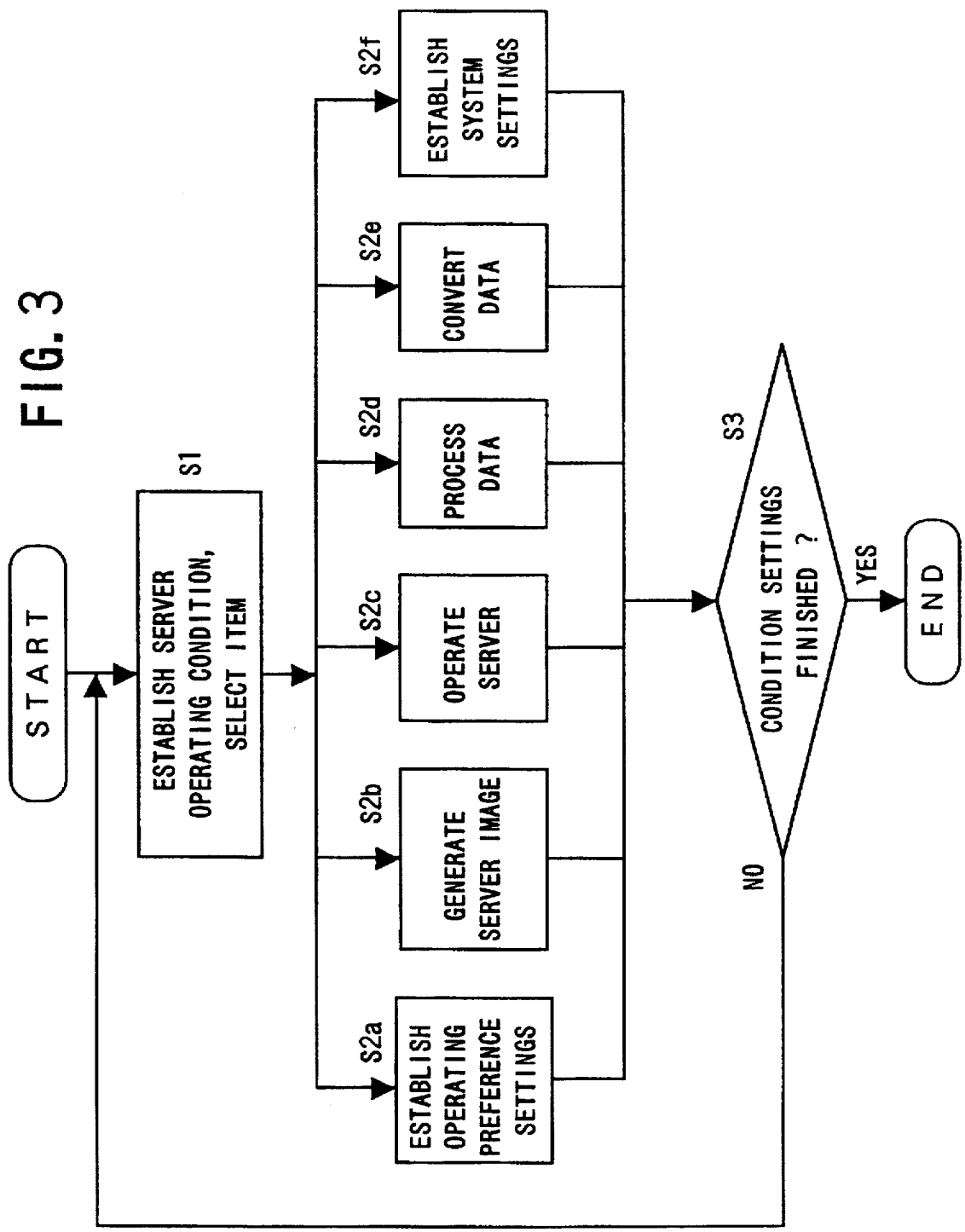
FIG. 3 is a flowchart of a process of establishing a server operating condition and selecting an item, which is carried out by the apparatus for processing quality control data shown in FIG. 1.

FIG. 3 shows a process of establishing a server operating condition and selecting an item, which is carried out by the quality control data processing apparatus 10.

When the quality control data processing apparatus 10 starts to operate, the master CPU 12 reads image data of a menu for establishing a server operating condition and selecting an item from the ROM 18 and displays the image of the menu (see FIG. 4) in a step S1. If the operator touches the touch panel 16 to select "SYSTEM SETTINGS", for example, then the position decoder 17 detects the position of the "system settings" on the touch panel 16, and delivers the detected position to the master CPU 12. The master CPU 12 reads image data for establishing system settings from the ROM 18, displays the image data on the CRT 14, and establishes system settings in a step S2f. In a step S3, the process shown in FIG. 3 is finished or continued for establishing another server operating condition or selecting another item.

Figure 5:
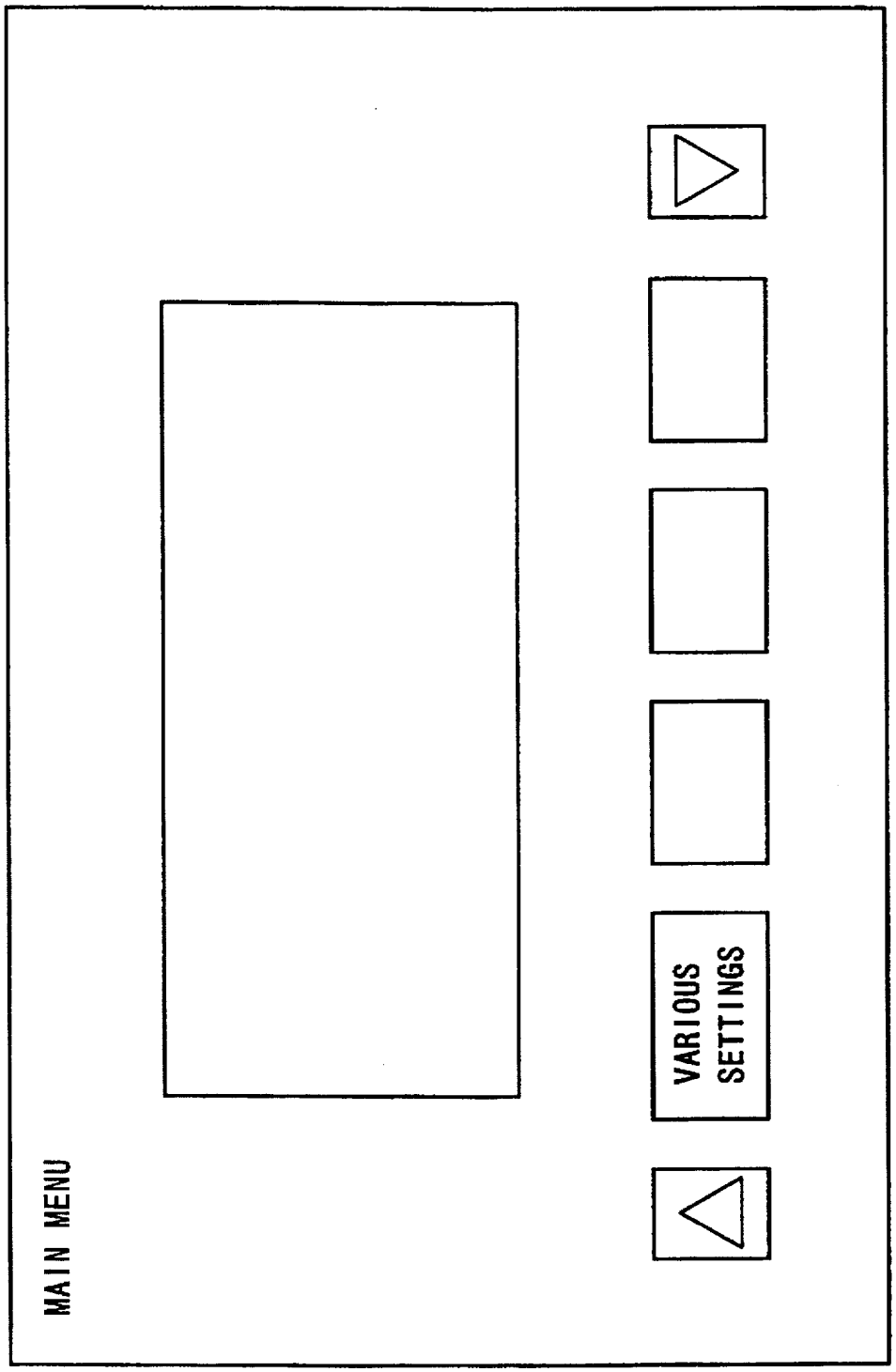
FIG. 5 is a view illustrative of a displayed image of a main menu in a process of establishing system settings of the apparatus for processing quality control data shown in FIG. 1.
Figure 6:
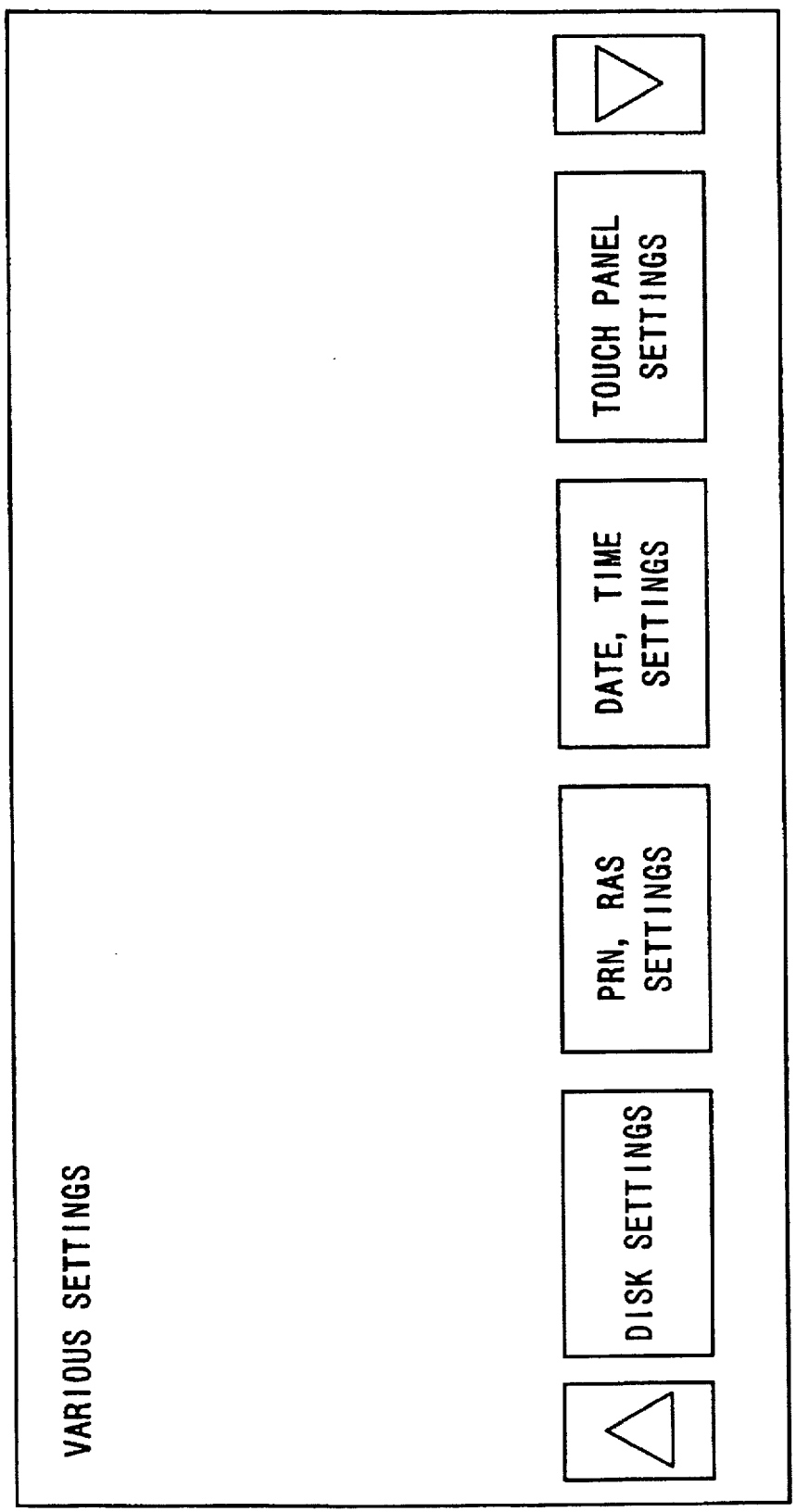
FIG. 6 is a view illustrative of a displayed image of a system setting menu in the process of establishing system settings of the apparatus for processing quality control data shown in FIG. 1.

A main menu for establishing system settings is shown in FIG. 5. This main menu is a mode for establishing basic conditions required for the quality control data processing apparatus 10 to operate as a server. When the operator touches the touch panel 16 at "VARIOUS SETTINGS", the master CPU 12 reads image data of a system setting menu shown in FIG. 6 from the ROM 18, and displays the system setting menu on the CRT 14. If the operator touches the touch panel 16 at "DISK SETTINGS", for example, then the CRT 14 displays a disk setting dialog box shown in FIG. 7. In the drawings, the letters "MO" and "FDD" are acronyms of a magnet optical disk and a floppy disk driver.

The disk setting dialog box is a mode for the quality control data processing apparatus 10 to establish any of the external memories 22 as a storage medium for storing quality control data delivered from the various stations. The disk setting dialog box has two items that can be established, i.e., "DISK" and "REGISTERED NAME". The item "DISK" represents drive numbers which the system has, and the item "REGISTERED NAME" represents names corresponding to the drive numbers, which can arbitrarily be selected by the operator. If the operator selects the item "REGISTERED NAME", then the selected area changes its color, and the system enters a character input mode. The operator then enters a registered name with an arbitrary string of characters, and establish the entered registered name.

If the operator selects the item "DISK", then the CRT 14 displays a drive registering and setting dialog box shown in FIG. 8, showing drive numbers which the system has. The operator selects any arbitrary drive from the displayed drive numbers. A data storage medium has now been specified for searching for and converting quality control data delivered from the stations and reusing stored data.

Other settings will be described below. If the operator touches the touch panel 16 at "PRN, RAS SETTINGS" (see FIG. 6), for example, then the type of a printer which will be used is established (PRN), and the inputting of a power failure signal from an external device upon a power failure is established (RAS). If the operator touches the touch panel 16 at "DATE, TIME SETTINGS", then a year, a date, and a time are entered. If the operator touches the touch panel 16 at "TOUCH PANEL SETTINGS", then coordinates, sensitivity, etc. of the touch panel 16 are established.

Figure 4:
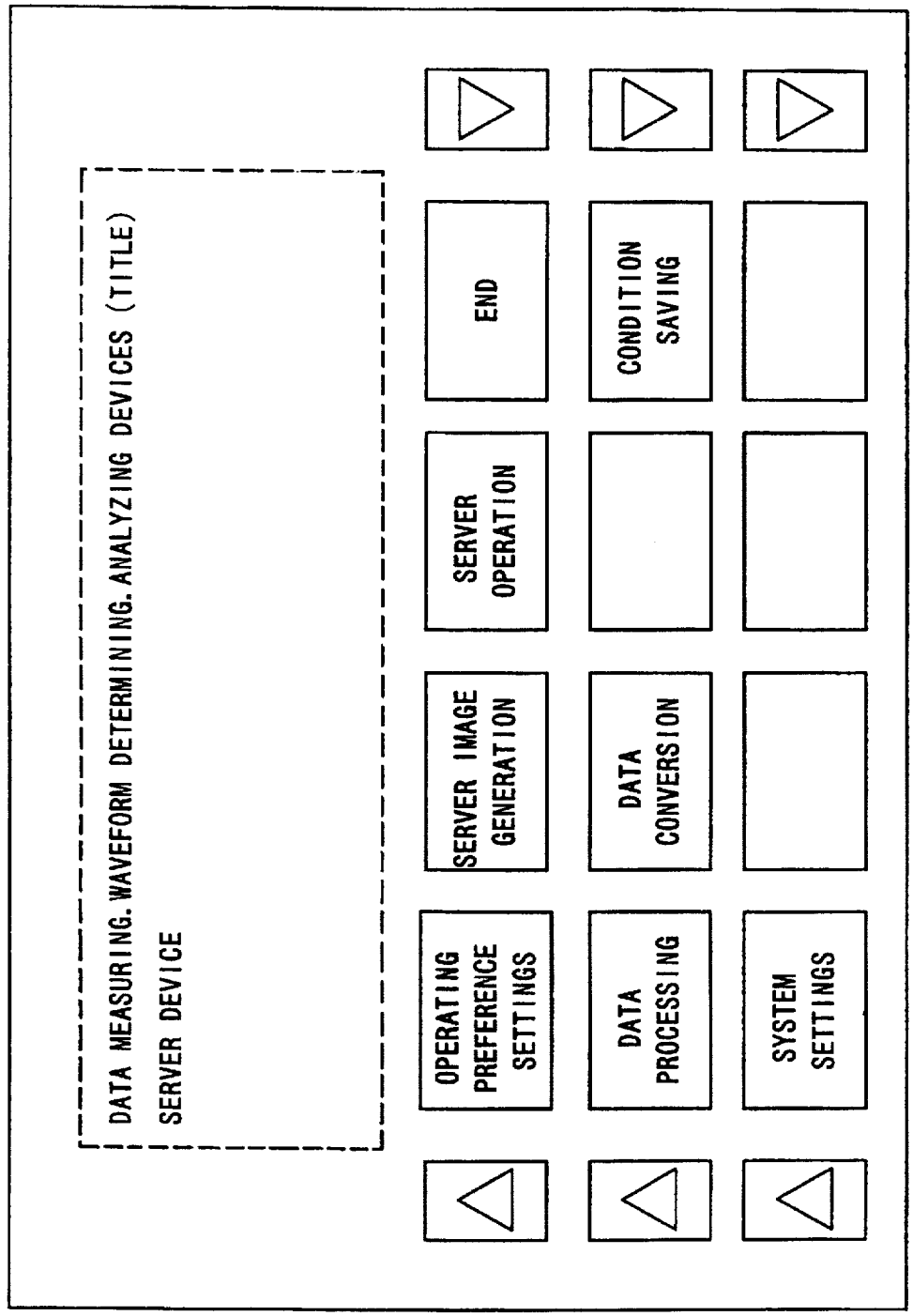
FIG. 4 is a view illustrative of a displayed image of a menu in the process of establishing a server operating condition in the flowchart shown in FIG. 3.
Figure 9:
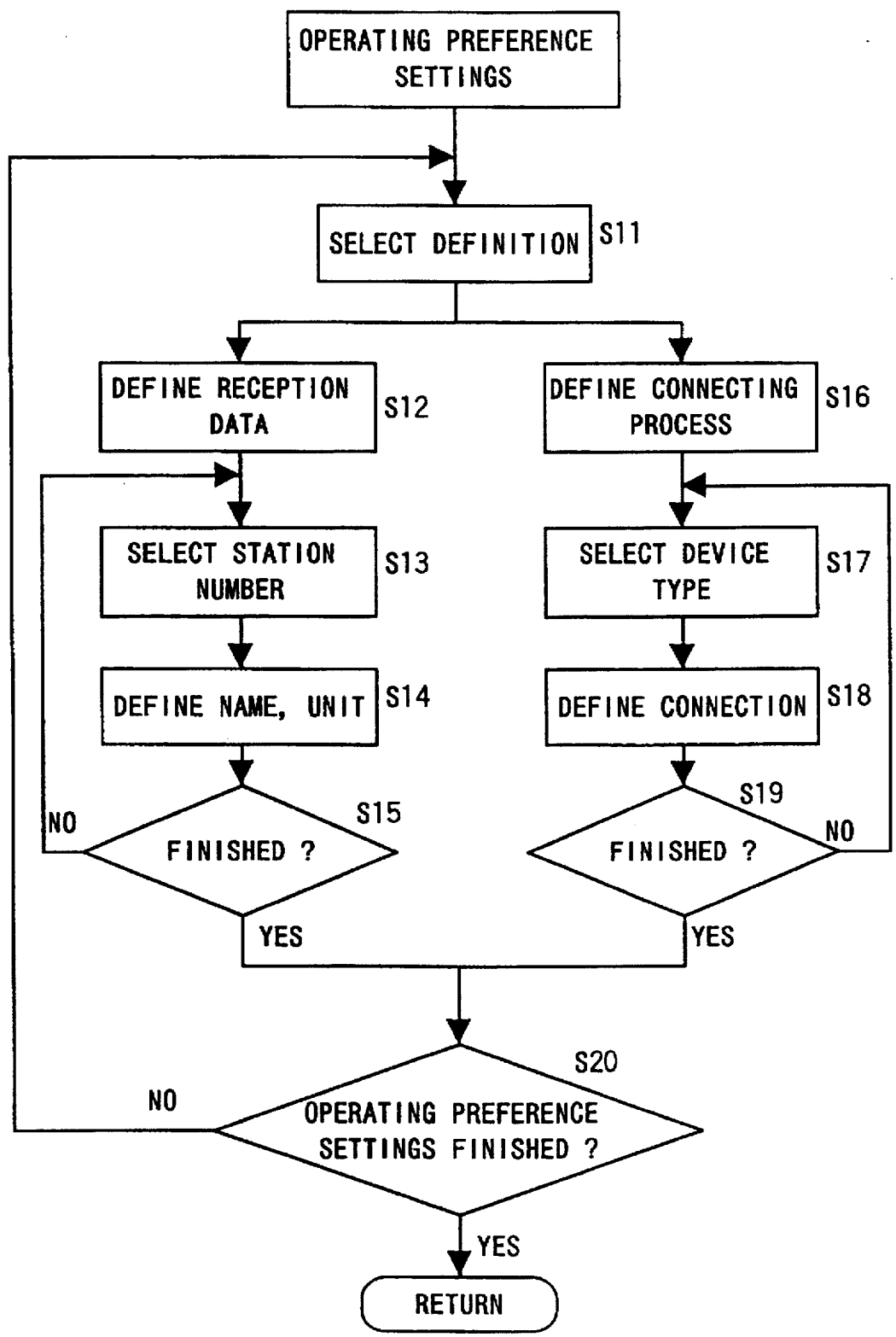
FIG. 9 is a flowchart of a process of establishing operating preference settings of the apparatus for processing quality control data shown in FIG. 1.

If the operator selects "OPERATING PREFERENCE SETTINGS" on the menu shown in FIG. 4 in a step S2a in FIG. 3, then the master CPU 12 transfers control to the operating preference setting unit 26. The operating preference setting unit 26 then carries out a process of establishing operating preference settings as shown in FIG. 9.

In the process of establishing operating preference settings, the operating preference setting unit 26 reads image data of a definition selecting menu shown in FIG. 10 from the ROM 27, and displays the definition selecting menu on the CRT 14. As can be seen from FIG. 10, the operating preference settings serve to effect "RECEPTION DATA DEFINITION" and "CONNECTING PROCESS DEFINITION". If "RECEPTION DATA DEFINITION" is selected in steps S11, S12 in FIG. 9, then the CRT 14 displays a data defining dialog box shown in FIG. 11. In the data defining dialog box, the operator establishes station numbers, connecting definitions of the inspecting and measuring devices in the stations, and names of the devices in the stations.

The connecting definitions serve to indicate whether the inspecting and measuring devices are general-purpose inspecting devices (general-purpose QA devices) or sequencers. If the inspecting and measuring device installed in a station is a sequencer, then a station (ST) number is selected in a step S13, and data definition is effected to name and manage data delivered from the station. When a station number is selected, the CRT 14 displays a data defining (for the station 4, for example) dialog box shown in FIG. 12. Then, a data number, a data name, and a unit of data delivered from the station are established and registered in a step S14. If the definition of the data is finished in a step S15, then it is determined whether the process of establishing operating preference settings has been finished or not in a step S20.

If "CONNECTING PROCESS DEFINITION" is selected in steps S11, S16, then the CRT 14 displays a type selecting dialog box shown in FIG. 13. In the type selecting dialog box, the operator selects type numbers of devices installed in the stations in a step S17. Then, in a connection process defining dialog box which is displayed on the CRT 14 as shown in FIG. 14, the operator establishes station numbers, connecting definitions of the inspecting and measuring devices in the stations, and names of the devices in the stations in a step S18. As described above, the connecting definitions serve to indicate whether the inspecting and measuring devices are general-purpose inspecting devices (general-purpose QA devices) or sequencers. The term "4AT" displayed in the dialog box shown in FIG. 14, for example, stands for a four-speed automatic transmission.

The definition of a discharge station serves to indicate a station for counting products on a production line to which the quality control data processing apparatus 10 is connected. In a quality control process, the number of products that have been manufactured is incremented by 1 only when a product passes through an indicated discharge station. If the above definitions and indications have been finished in a step S19, then the process of establishing operating preference settings is finished in the step S20.

Figure 15:
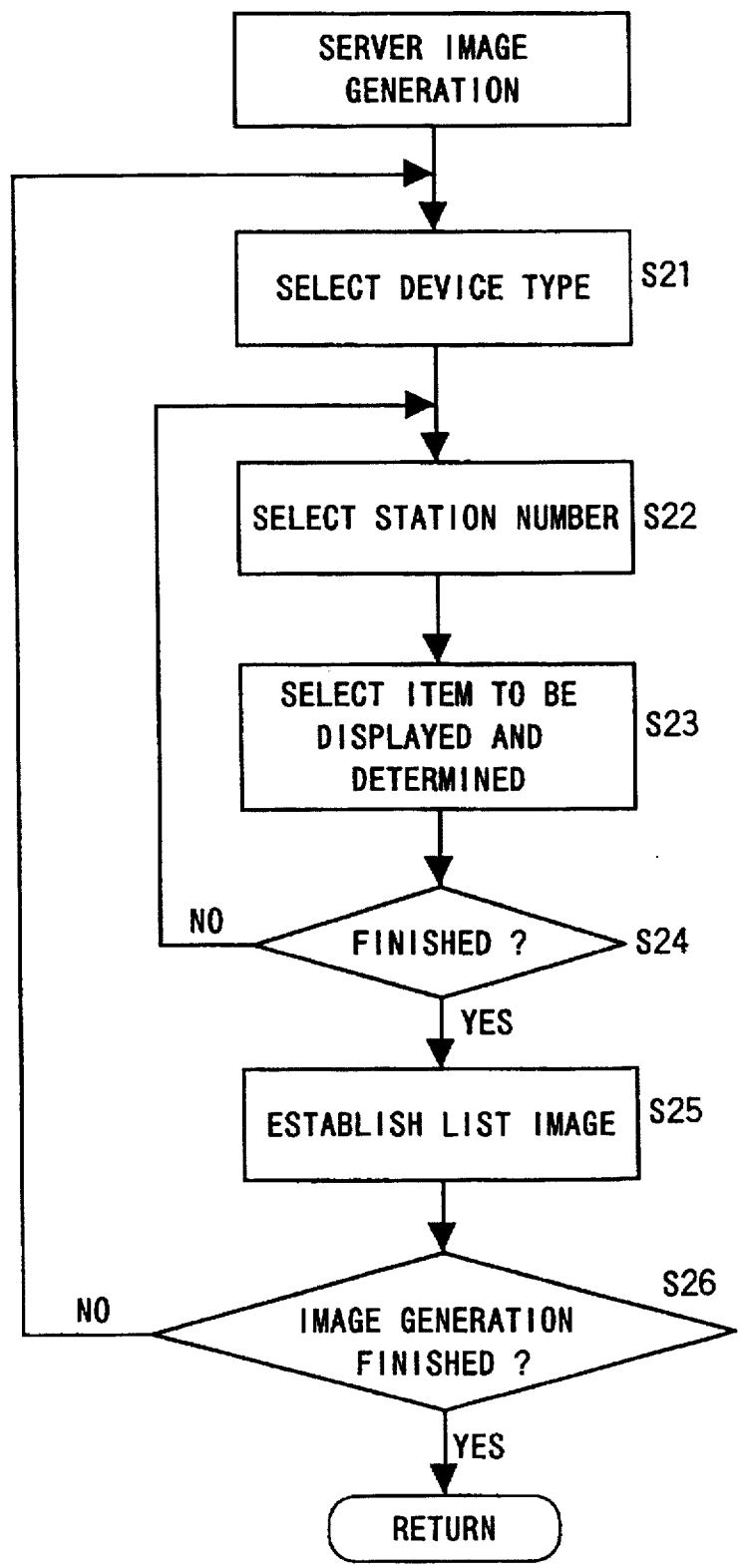
FIG. 15 is a flowchart of a process of generating a displayed server image in the apparatus for processing quality control data shown in FIG. 1.

If the operator selects "SERVER IMAGE GENERATION" on the menu shown in FIG. 4 in a step S2b in FIG. 3, then the master CPU 12 transfers control to the server image generating unit 28. The server image generating unit 28 then carries out a process of generating a displayed server image as shown in FIG. 15.

The server image generating unit 28 reads image data of a type selecting dialog box shown in FIG. 16 from the ROM 29, and displays the type selecting dialog box for the selection of a device type in a step S21. After having selected a device type, the operator selects station (ST) numbers for the generation of a list image in a station selecting dialog box which is displayed on the CRT 14 as shown in FIG. 17 in a step S22. Then, the operator selects a desired number of items (titles to be determined) to be displayed in a displayed and determined item selecting dialog box which is displayed on the CRT 14 as shown in FIG. 18 in a step S23. If "DETERMINE" is selected in the displayed and determined item selecting dialog box shown in FIG. 18 in a step S24, control returns to the station selecting dialog box shown in FIG. 17.

If the selection of desired stations and displayed and determined items is finished, then the CRT 14 displays a list image generating dialog box shown in FIG. 19. In the list image generating dialog box, the operator determines whether a device type, a date, and a product number are to be displayed or not in a step S25. Then, the process of generating a displayed server image is completed in a step S26. A server image is thus generated to display, in a desired format, quality control data that are delivered to the quality control data processing apparatus 10 for each of the connected devices in the stations.

Figure 20:
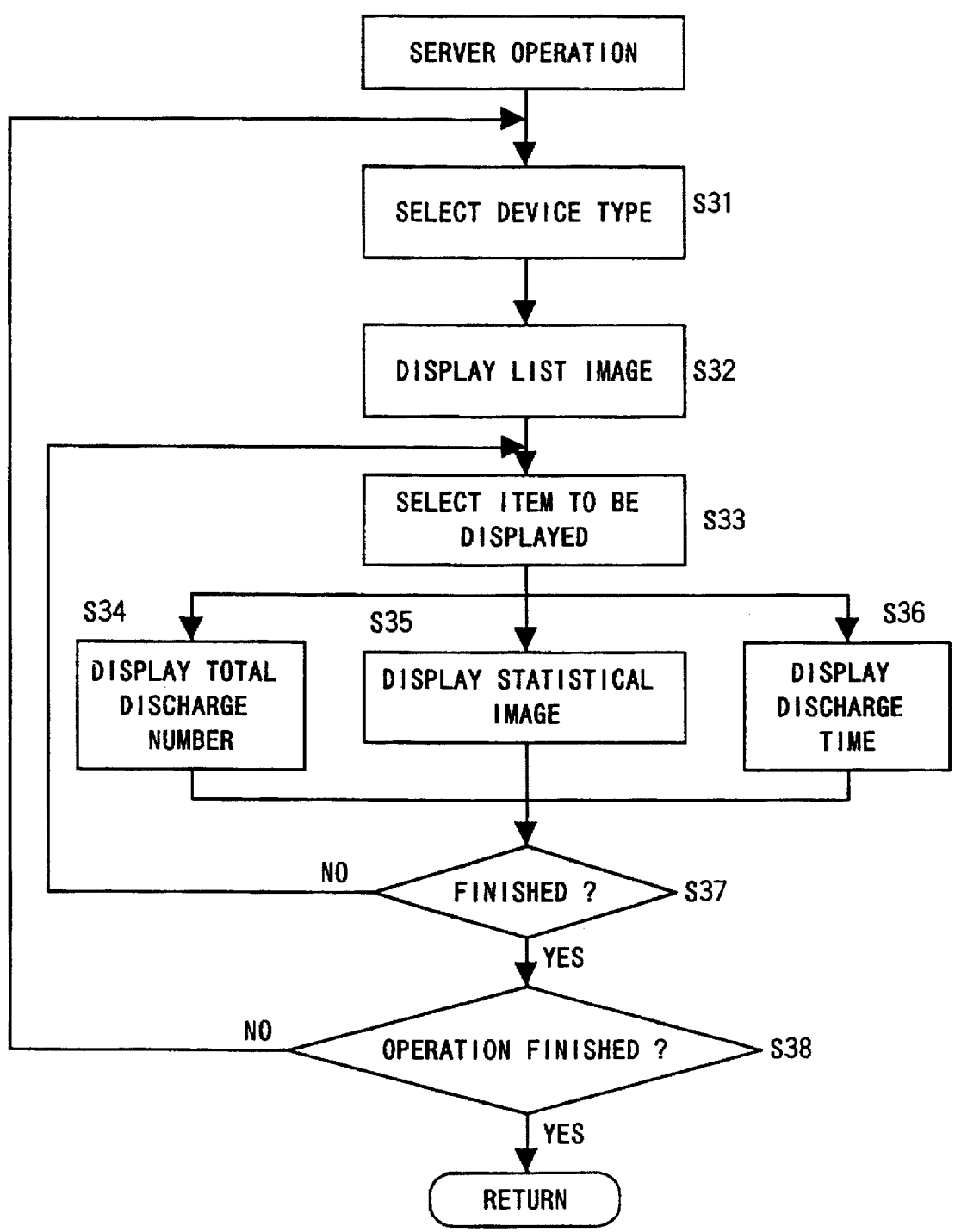
FIG. 20 is a flowchart of a process of operating a server in the apparatus for processing quality control data shown in FIG. 1.

If the operator selects "SERVER OPERATION" on the menu shown in FIG. 4 in a step S2c in FIG. 3, then the master CPU 12 transfers control to the server operating unit 30. The server operating unit 30 then carries out a process of operating a server as shown in FIG. 20.

The server operating unit 30 reads image data of a type selecting dialog box shown in FIG. 21 from the ROM 31 and displays the type selecting dialog box on the CRT 14 for the selection of a device type in a step S31. After a device type has been selected and when "DETERMINE" in the type selecting dialog box is selected, the CRT 14 displays a list image (see FIG. 22) which has been defined in the list image generating dialog box in the process of generating a displayed server image, with respect to the selected device type in a step S32. The operator then selects one of display items for displaying the total number of discharged products, a statistical image, and discharge times in a step S33.

If the display item for displaying the total number of discharged products is selected in a step S34, then the CRT 14 displays an image of a total discharged number as shown in FIG. 23 with respect to the device type which has been selected as described above. If the display item for displaying a statistical image is selected in a step S35, then the CRT 14 displays an image of statically data as shown in FIG. 24 with respect to the selected device to the selected device type. In FIG. 24, the symbol "σ" represents a standard deviation. If the display item for displaying discharge times is selected in a step S36, then the CRT 14 displays an image of discharged times as shown in FIG. 25 with respect to the selected device type. When the display of the desired display item is finished in a step S37, the process of operating a server is finished in a step S38.

Figure 26:
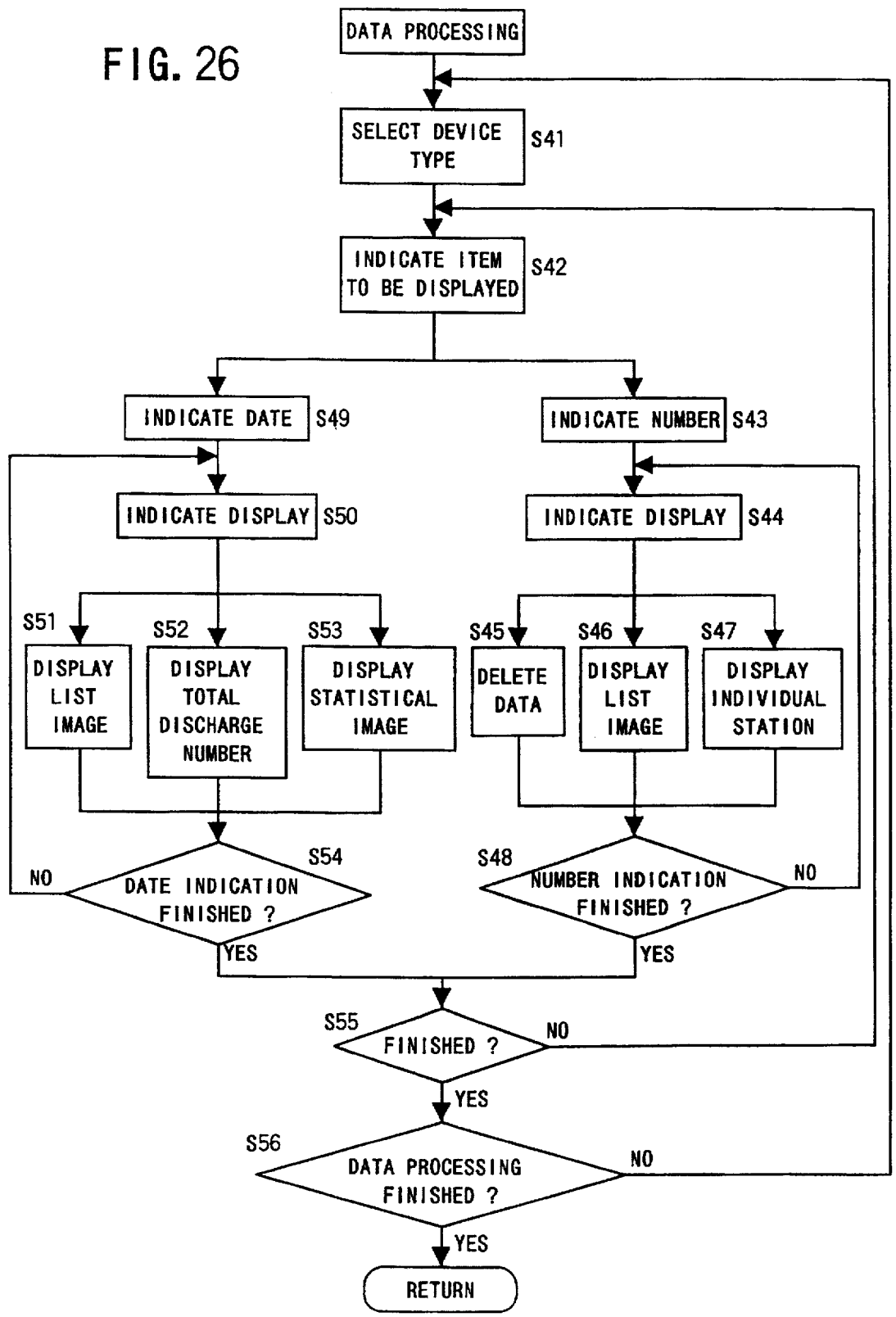
FIG. 26 is a flowchart of a process of processing data in the apparatus for processing quality control data shown in FIG. 1.

If the operator selects "DATA PROCESSING" on the menu shown in FIG. 4 in a step S2d in FIG. 3, then the master CPU 12 transfers control to the data processing unit 32. The data processing unit 32 then carries out a process of processing data as shown in FIG. 26.

The data processing unit 32 reads image data of a type selecting dialog box shown in FIG. 27 from the ROM 33 and displays the type selecting dialog box on the CRT 14 for the selection of a device type to be handled in data processing and a data displaying method in steps S41, S42. The operator selects a device type. Then, in the same type selecting dialog box, the operator indicates a number in a step S43 or a date in a step S49. The letters "BS", "SH" in the drawings represent automobile type codes.

If a number is indicated in the step S43, then the CRT 14 displays a type/number selecting dialog box shown in FIG. 28 in a step S44. The operator enters a number which the operator wants to be searched for in the position of NUMBER (1) in the type/number selecting dialog box. If the operator selects (2) in the position of DETERMINED RESULT, then the default data indicate a Good result. Repeated selection causes the default data to switch between poor and Good results repeatedly. After the selection, the operator selects data deletion, the display of a list image, or the display of individual stations.

Figure 29:
FIG. 29 is a view illustrative of a displayed image of a list in the process of processing data in the apparatus for processing quality control data shown in FIG. 1.

If the data deletion is selected in a step S45, then the password of the operator is entered for a priority check. After the right of the operator to delete data is confirmed, desired data can be deleted. If the display of a list image is selected in a step S46, then the CRT 14 displays an image of a list as shown in FIG. 29 with respect to the selected device type. If the display of individual stations is selected in a step S47, then the CRT 14 displays an individual station display dialog box for automatic operation as shown in FIG. 30 with respect to the selected device type, and then displays an image of each individual station as shown in FIG. 31.

If the operator indicates a date in the step S49, then the CRT 14 displays a date indicating dialog box shown in FIG. 32 in a step S50. The operator selects desired dates which the operator wants to be searched for. In the same date indicating dialog box, the operator also selects the display of an image of a list, the display of the total number of discharged products, or the display of a statistical image in a step S50.

If the display of a list image is selected in a step S51, then the CRT 14 displays an image of a list as shown in FIG. 29 with respect to selected dates. If the display of the total number of discharged products is selected in a step S52, then the CRT 14 displays an image of a total discharged number as shown in FIG. 33. If the display of a statistical image is selected, then the CRT 14 displays an image of statistical data as shown in FIG. 34.

If the number or date indication is finished in steps S48, S54, then control proceeds to a step S55. If the desired processing is finished in the step S55, then the process of processing data is finished in a step S56.

Figure 35:
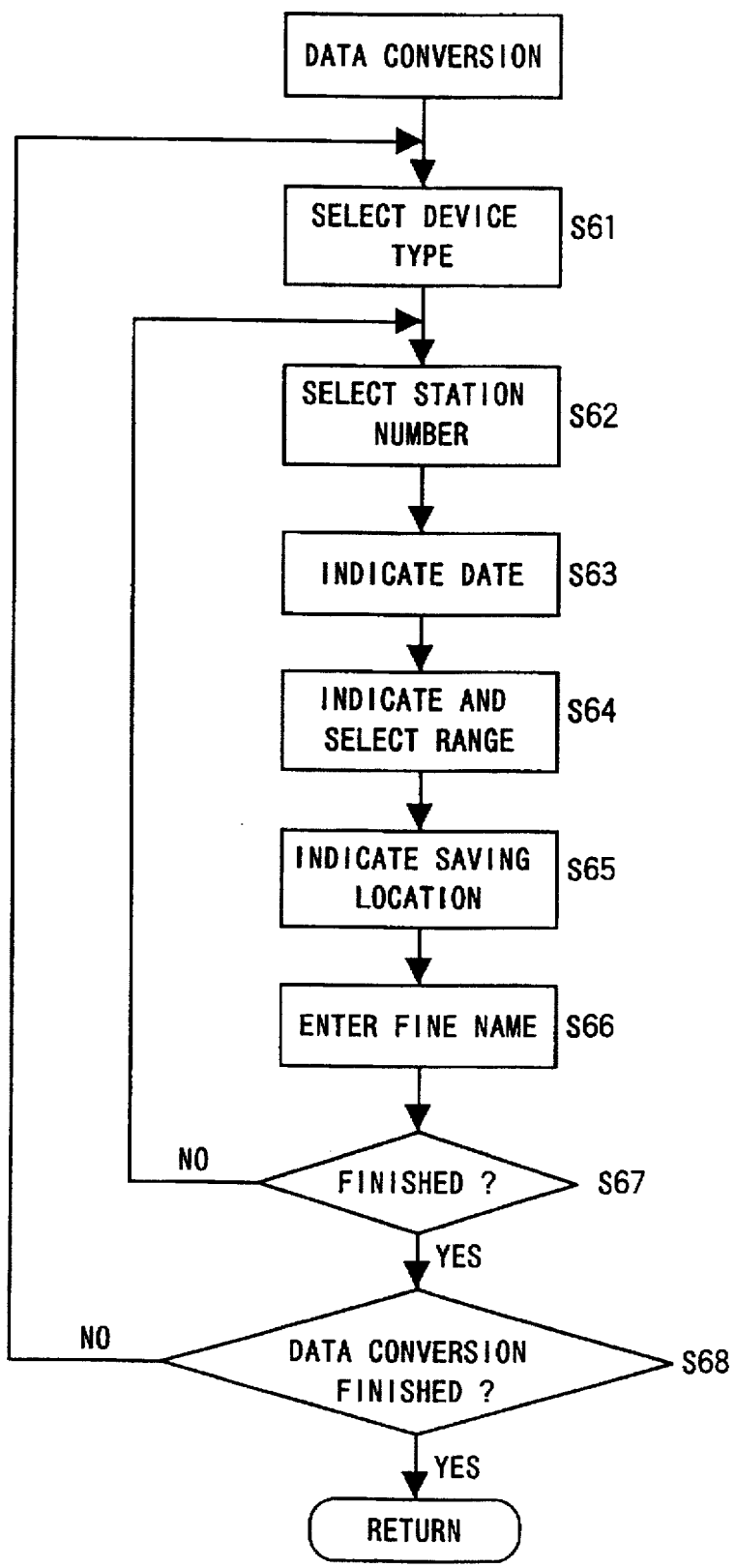
FIG. 35 is a flowchart of a process of converting data in the apparatus for processing quality control data shown in FIG. 1.

If the operator selects "DATA CONVERSION" on the menu shown in FIG. 4 in a step S2e in FIG. 3, then the master CPU 12 transfers control to the data converter 34. The data converter 34 then carries out a process of converting data as shown in FIG. 35.

The data converter 34 reads image data of a type selecting dialog box shown in FIG. 36 from the ROM 37, and displays the type selecting dialog box on the CRT 14. The operator selects a device type for which data conversion is desired in a step S61, and then selects a station number for which data conversion is desired in a station selecting dialog box shown in FIG. 37 which is displayed on the CRT 14 in a step S62. After a device type and a station number have been selected, the CRT 14 displays a date indicating dialog box shown in FIG. 38 with respect to the selected device type and station number. The operator indicates dates for which data conversion is desired in a step S63.

When dates are indicated, the CRT 14 displays a range indicating and selecting dialog box shown in FIG. 39 with respect to the selected device type and station number and the indicated dates. The operator selects a first data number and a final data number of the data to be converted in a step S64. When "DETERMINE" is selected in the range indicating and selecting dialog box, the CRT 14 displays a saving location selecting dialog box shown in FIG. 40. In the saving location selecting dialog box, the operator enters a data saving location and a saving file name in steps S65, S66. The location where converted data can be saved switches from a floppy disk (FD) to a hard disk (HD) to a memory (MO) each time a selection is made, so that the operator can select any one of available locations which the operator wants the data to be saved in. When "DETERMINE" is selected in the saving location selecting dialog box, the CRT 14 displays a data conversion dialog box shown in FIG. 41, and the indicated data are converted and the converted data are saved in a selected file. When the desired data conversion is finished in a step S67, the process of converting data is finished in a step S68.

The quality control data processing apparatus according to the present invention, as described above, allows the operator to establish and enter parameters relative to inspection processes through an input means on an interactive basis from menus and dialog boxes displayed on a display monitor, so that quality control data, including measured data and determined-quality data, from the inspection processes can be processed and managed altogether easily without the need for the operator to be knowledgeable in programming. The quality control data processing apparatus can be used with production lines for producing, and inspection processes for inspecting, various different types of products.

Although a certain preferred embodiment of the present invention has been shown and described in detail, it should be understood that various changes and modifications may be made therein without departing from the scope of the appended claims.

What is claimed is:

1. A quality control data processing apparatus for processing quality control data from a plurality of measuring devices and/or inspecting devices connectable thereto and installed respectively in each of a plurality of processes of a production line manufacturing products, said quality control data processing apparatus comprising:

a master central processing unit for controlling the apparatus;

a read-only memory storing a control program for said master central processing unit;

a display unit for outputting data; and a touch panel for inputting data;

said apparatus further comprising:

an operating preference setting unit enabling an operator to establish connection settings that establish connections between said quality control data processing apparatus and said plurality of measuring devices and/or inspecting devices, and for setting names including units with respect to the data delivered from the plurality measuring devices and/or the inspecting devices to said quality control data processing apparatus;

a server image generating unit for indicating whether items established by said operating preference setting unit are to be displayed or not, thereby to generate an image to be displayed;

a server operating unit for processing and displaying quality control data delivered from the plurality of measuring devices and/or inspecting devices according to conditions indicated by said operating preference setting unit and said server image generating unit;

a data processing unit for searching for and displaying quality control data related to the products; and a data converter for searching for the quality control data related to the products, converting the quality control data into statistically processable data, and displaying the statistically processable data;

the arrangement being such that images are displayed on said display unit and selections and settings are made through said touch panel for thereby centrally processing the quality control data in the apparatus and the plurality of measuring devices and/or inspecting devices connected thereto.

2. The apparatus according to claim 1, said data converter including:

a statistical data converting unit for searching for the quality control data related to the products and converting the quality control data into statistically processable data; and a statistical processing unit for searching for the quality control data related to the products and statistically processing the quality control data.

3. The apparatus according to claim 1, wherein said operating preference setting unit includes means for displaying, on said display unit, an image enabling an operator to establish connection settings that establish connections between said quality control data processing apparatus and the plurality of measuring device and/or inspecting devices and settings of names including units with respect to data delivered from the plurality of measuring devices and/or inspecting devices, based on selections and settings made by the operator through said touch panel.

4. The apparatus according to claim 1, wherein said server image generating unit includes means for displaying, on said display unit, an image for indicating whether items established by said operating preference setting unit are to be displayed or not, based on selections and settings made by the operator through said touch panel.

5. The apparatus according to claim 1, wherein said server operating unit includes means for displaying, on said display unit, an image for processing and displaying quality control data delivered from the plurality of measuring devices and/or inspecting devices according to conditions indicated by said operating preference setting unit and said server image generating unit, based on selections and settings made by the operator through said touch panel.

6. The apparatus according to claim 1, wherein said data processing unit includes means for displaying, on said display unit, an image for searching for and displaying quality control data related to the products, based on selections and settings made by the operator through said touch panel.

7. The apparatus according to claim 1, wherein said data converter includes means for displaying, on said display unit, an image for searching for the quality control data related to the products and converting the quality control data into statistically processable data, based on selections and settings made by the operator through said touch panel.

* * * * *